United States Patent
Robertson et al.

(10) Patent No.: US 7,007,364 B2
(45) Date of Patent: Mar. 7, 2006

(54) TAG NAILING SYSTEM

(75) Inventors: John A. Robertson, Chillicothe, OH (US); Ken R. Vaughn, Kingston, OH (US)

(73) Assignee: Infosight Corporation, Chillicothe, OH (US)

( * ) Notice: Subject to any disclaimer, the term of this patent is extended or adjusted under 35 U.S.C. 154(b) by 41 days.

(21) Appl. No.: 10/890,021

(22) Filed: Jul. 13, 2004

(65) Prior Publication Data

US 2006/0010676 A1     Jan. 19, 2006

(51) Int. Cl.
*B23P 11/00* (2006.01)
*B25C 3/00* (2006.01)
*F16B 15/00* (2006.01)

(52) U.S. Cl. .................. 29/432; 227/107; 227/120; 411/441; 206/338; 206/347

(58) Field of Classification Search .................. 29/432, 29/428, 525, 798, 244; 411/487, 493, 498, 411/508; 227/120
See application file for complete search history.

(56) References Cited

U.S. PATENT DOCUMENTS

| | | | | |
|---|---|---|---|---|
| 3,812,961 A | * | 5/1974 | Merrick et al. | 206/338 |
| 4,047,611 A | * | 9/1977 | Damratowski | 206/347 |
| 4,718,551 A | * | 1/1988 | Whitledge | 206/347 |
| 5,714,234 A | * | 2/1998 | Robertson | 428/195.1 |
| 5,791,546 A | * | 8/1998 | McGuinness et al. | 227/120 |

* cited by examiner

*Primary Examiner*—David P. Bryant
*Assistant Examiner*—Douglas E Mazzuca
(74) *Attorney, Agent, or Firm*—Mueller and Smith, LPA

(57) ABSTRACT

A nail module for nail attachment of metal tags to hot steel includes a nail and a fracturable carrier. The nail has a pointed shank and a head. The carrier houses the nail and has a delivery end and a female socket end. The carrier delivery end is adapted to receive said nail shank. The female socket end is adapted to receive said nail head. The female socket end also is adapted to receive a mandrel for carrying the module to a driving location in an orientation for driving the nail into a workpiece. The carrier is fractured and releases the nail when the mandrel drives the nail into a workpiece.

8 Claims, 1 Drawing Sheet

TAG NAILING SYSTEM

CROSS-REFERENCE TO RELATED APPLICATIONS

None

STATEMENT REGARDING FEDERALLY SPONSORED RESEARCH

Not applicable.

BACKGROUND OF THE INVENTION

The present invention relates to the marking of metal for tracking and identification purposes, and more particularly to imprinted metal tags that can be nail attached to metal workpieces.

Primary metal mills require that their products be accurately identified. Molten metal batches have unique "heat" (batch) chemistries that affect the mechanical properties of the ultimate (further formed) end products. Tracking the many individual pieces produced from a heat is a difficult, time-consuming process with many opportunities for error in the stressful (hot, noisy, dimly lit, and physically dangerous) mill environment.

Metals first exit the molten heat as very hot (e.g., 1,800° F. or 982° C.) slabs, blooms, or billets. Ideally, these slabs, blooms, and billets should be identified with bar coded information immediately after they solidify and while they are still on the run out tables (before they can be mixed up). Automatic identification (e.g., bar codes) is preferred because it helps eliminate the errors inherent in manual marking and reading (estimated by some to be as high as 1 in 300 attempts).

High temperature tags (some with bar codes) have been used for some time. For example, such tags may be manually affixed to the slab or billet using a powder charged or pneumatically driven nail gun. Efforts to automate this prior art tag attachment have generally not been successful, because, the nailing mechanism is difficult to automate, as the environment is not conducive to bowl feeders. Nail "sticks" are limited to, say, 50 nails and stick feeds are unproven. There are also ergonometric and safety issues with the standard gun offerings.

The present invention addresses the need for attachment of tags to hot metal, including hot stainless steel, with an automatic nail gun and more generally to a novel nail module.

BRIEF SUMMARY OF THE INVENTION

A nail module for nail attachment of metal tags to hot steel includes a nail and a fracturable carrier. The nail has a pointed shank and a head. The carrier houses the nail and has a delivery end and a female socket end. The carrier delivery end is adapted to receive said nail shank, optionally with fins to hold the nail shank in position. The female socket end is adapted to retain said nail head. The female socket end also is adapted to receive a mandrel for carrying the module from a storage station to a driving location in an orientation for driving the nail into a workpiece. The carrier is fractured and releases the nail when the mandrel drives the nail into a workpiece.

BRIEF DESCRIPTION OF THE DRAWINGS

For a fuller understanding of the nature and advantages of the present invention, reference should be had to the following detailed description taken in connection with the accompanying drawings, in which.

The drawings will be described in more detail below.

DETAILED DESCRIPTION OF THE INVENTION

Figure 1:
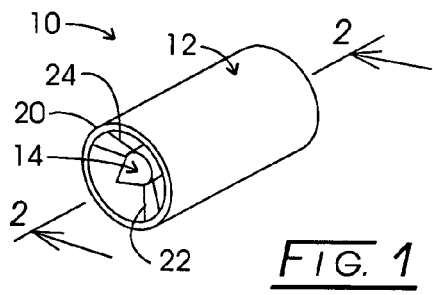
FIG. 1 is a perspective view of the inventive nail module.
Figure 2:
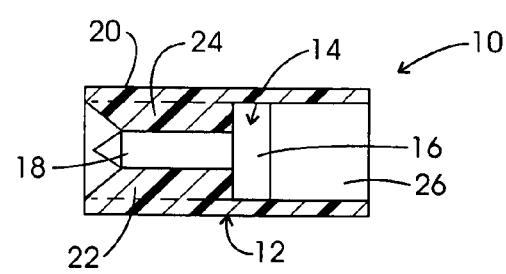
FIG. 2 is a cross-sectional elevation view taken along line 2—2 of FIG. 1.

Referring initially to FIGS. 1 and 2, a nail module, 10, is seen to include an outer fracturable carrier, 12, and a nail, 14. Nail 14 includes a head, 16, and a pointed shank, 18. Nail 14 broadly is a fastener, but generally includes a pointed shank and a head. Nail 14 is made from metal, usually hardened steel so that it can penetrate into the tag and workpiece and so that it can withstand the high temperatures of the workpiece.

Carrier 12 preferably is cylindrical in shape to ensure that it does not get hung up in use by having square corners. Carrier 12 has a delivery end, 20, adapted to retain pointed nail shank 18 of nail 14. Advantageously, delivery end 20 has inwardly extending or interior fins, such as fins 22 and 24, to align shank 18 so that it gets delivered in the proper orientation to the workpiece. While the pointed tip of nail shank 18 may extend beyond delivery end 20 of carrier 12, advantageously none of nail shank 18 extends outside of carrier 12.

Carrier 12 also has a female socket end, 26, which is adapted to retain head 16 of nail 14. Female socket end 26 also is configured to receive a mandrel, 28 (see FIG. 3), which can rest against nail head 16 within socket end or cavity 26. Female socket end 26 also facilitates automated alignment of fastener 14 coaxial to driving mandrel 28.

Figure 3:
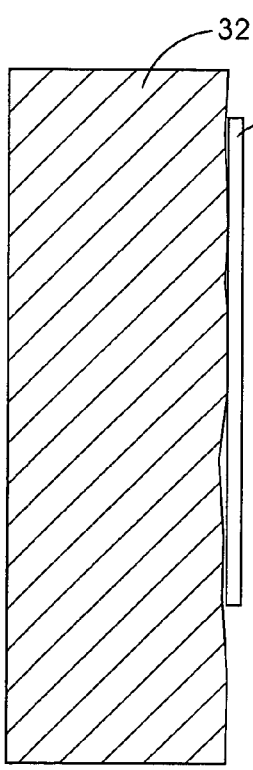
FIG. 3 is a cross-section view like FIG. 2 showing the inventive nail module being carried by a mandrel to attach a metal tag to a workpiece.

Referring now to FIG. 3, nail module 10/mandrel 28 assembly 30 is seen in a confronting orientation to a workpiece, 32, and informational tag, 34. Arrow 36 indicates the direction that mandrel 28 is carrying nail module 10. Mandrel 28 can pick up nail module 10 at any convenient storage location and carry it to an attachment station whereat tag 34 is to be affixed or attached to workpiece 32. Mandrel 28 is actuated or energized by an air piston or other conventional motive force, well known to those skilled in this art field.

Figure 4:
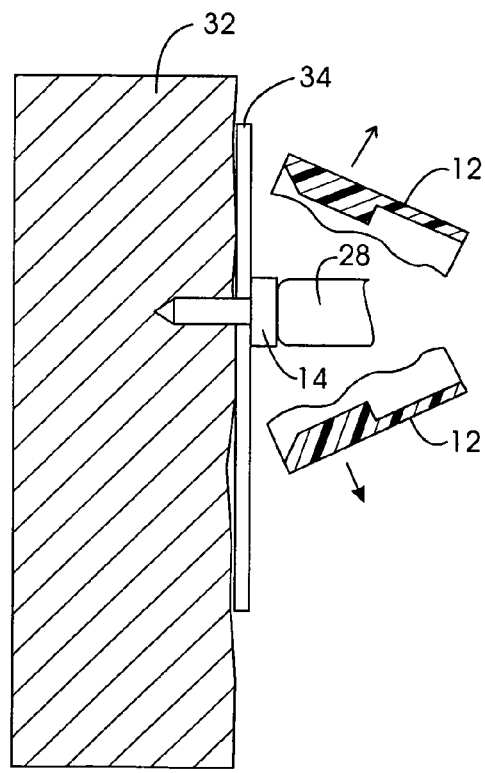
FIG. 4 is a cross-sectional elevation view of the inventive nail module carrier being fractured by the driving action of the mandrel as it drives the nail into the workpiece in order to affix the tag to the workpiece.

Referring to FIG. 4, when carrier delivery end 20 reaches tag 34, mandrel 28 is thrust forward to drive nail 14 into and through tag 34 and into workpiece 32. At the same time, the mandrel driving force is sufficient for carrier 12 to be fractured to release nail 14. Carrier 12, then, is fracturable and disposable. Its sole purpose is to house nail 14 and to facilitate handling of nail 14 from a storage station to a delivery station. Carrier 12 also aids in aligning nail 14 for driving it into a workpiece by the driving action of mandrel 28. The flat end of delivery end 20 of carrier 12 can be placed flat against the workpiece or tag for stability and alignment of nail 14, because nail 14 advantageously is retained entirely within carrier 12. At this juncture of the tag attachment process, mandrel 28 is free to be moved back to the nail module storage station to pick up another nail module and the tag attachment process is repeated.

The cylindrical shape of plastic carrier 12 facilitates its handling from a bulk hopper (storage station) and the proper orientation can be verified prior to carrier 12 being placed on mandrel 28, for example, by using a proximity sensor positioned at the (justified) fastener point end. It also should be understood that the storage of additional nail modules is at a location remote from the hot billets, which protects them from melting or becoming sticky due to the hot billet temperatures. Carrier 12, then, is made from a brittle plastic that fractures readily when driving mandrel 28 is driven forward to drive fastener 14 into workpiece 32. Appropriate materials for this disposable piece, desirably are crystalline styrene or polystyrene; although, polyolefins or other plastics that fulfill the fracturable characteristics for carrier 12 disclosed herein may be used. Fractured carriers can be collected in, say, a hopper for recycling or for disposal.

While the invention has been described with reference to a preferred embodiment, those skilled in the art will understand that various changes may be made and equivalents may be substituted for elements thereof without departing from the precepts of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. A method for attaching a tag to a metal workpiece, which comprises the steps of:
   (a) moving a driving mandrel to a storage bin to pick up a nail module, which comprises:
      (i) a nail having a pointed shank and a head; and
      (ii) a fracturable carrier housing said nail and having a delivery end adapted to receive said pointed nail shank and a female socket retention end adapted to retain said nail head and to receive said driving mandrel for carrying the module from a storage station to a driving station in an orientation for driving said nail into a workpiece, said carrier being fractured and releasing said nail by said driving;
   by inserting said driving mandrel into the female socket end of said fracturable carrier to pick up said nail module;
   (b) moving said nail module/driving mandrel assembly to a driving position to confront a tag placed against a workpiece; and
   (c) driving said mandrel into said carrier housing to fracture said carrier housing to release said nail and to drive said nail through said tag and into said workpiece for attaching said tag to said workpiece.

2. The method of claim 1, wherein said tag is a metal tag and said workpiece is hot steel.

3. The method of claim 1, wherein said carrier is cylindrical.

4. The method of claim 1, wherein said carrier is made from plastic.

5. The method of claim 4, wherein said carrier is made from crystalline styrene.

6. The method of claim 1, wherein said carrier has interior fins for holding said pointed nail shank.

7. The method of claim 1, wherein none of the pointed nail shank extends outside of the carrier.

8. The method of claim 7, wherein said carrier delivery end is placed against said tag in step (b).

* * * * *